US012793679B2

(12) United States Patent
Akai et al.

(10) Patent No.: US 12,793,679 B2
(45) Date of Patent: Nov. 10, 2026

(54) ELECTRONIC KEYBOARD EQUIPMENT

(71) Applicant: CASIO COMPUTER CO., LTD., Tokyo (JP)

(72) Inventors: Hiroki Akai, Tokyo (JP); Naoto Imamura, Tokyo (JP); Yuuki Nakajima, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 280 days.

(21) Appl. No.: 18/604,204

(22) Filed: Mar. 13, 2024

(65) Prior Publication Data

US 2024/0321249 A1 Sep. 26, 2024

(30) Foreign Application Priority Data

Mar. 24, 2023 (JP) ................................ 2023-047946

(51) Int. Cl.
*G10H 1/34* (2006.01)

(52) U.S. Cl.
CPC .................................. *G10H 1/344* (2013.01)

(58) Field of Classification Search
CPC .......... G10H 1/344; G10H 1/32; G10H 1/346; G10H 1/34; G10C 3/12; G10D 3/00
See application file for complete search history.

(56) References Cited

FOREIGN PATENT DOCUMENTS

| | | | | | |
|---|---|---|---|---|---|
| EP | 1746578 | A1 | | 1/2007 | |
| FR | 3100366 | A1 | | 3/2021 | |
| JP | 2007-017614 | A | | 1/2007 | |
| JP | 2008-102494 | A | | 5/2008 | |
| JP | 2011-028034 | A | | 2/2011 | |
| JP | 2020064194 | A | * | 4/2020 | ............ G10H 1/346 |
| JP | 2021015253 | A | * | 2/2021 | |

OTHER PUBLICATIONS

JPO; Application No. 2023-047946; Notice of Reasons for Refusal dated Mar. 4, 2025.
EPO; Application No. 24161268.8; Extended European Search Report issued Aug. 2, 2024.

* cited by examiner

*Primary Examiner* — Kimberly R Lockett
(74) *Attorney, Agent, or Firm* — Fitch, Even, Tabin & Flannery LLP

(57) ABSTRACT

An electronic keyboard instrument includes a casing, a keyboard having multiple keys which are provided to be exposed from the casing, a sound emitting unit provided inside the casing, and multiple ribs provided between the keyboard and the sound emitting unit at a position corresponding to at least one of the multiple keys, and at least a part of spaces between the multiple ribs has an opening, and a communication passage is formed in the casing in such a manner as to extend from the sound emitting unit to reach a key gap between the multiple keys by way of the opening.

9 Claims, 7 Drawing Sheets

ELECTRONIC KEYBOARD EQUIPMENT

CROSS-REFERENCE TO RELATED APPLICATION

This application is based upon and claims the benefit of priority under 35 USC 119 of Japanese Patent Application No. 2023-047946 filed on Mar. 24, 2023, the entire disclosure of which, including the specification, claims, drawings and abstract, is incorporated herein by reference in its entirety.

BACKGROUND

Technical Field

The present disclosure relates to electronic keyboard equipment.

Description of the Related Art

There have conventionally been known electronic keyboard instruments which can provide a key press-down feeling closer to a key press-down feeling provided by a real piano by including a mass element such as a hammer. For example, Japanese Unexamined Patent Application Publication No. 2007-17614 discloses a keyboard structure of an electronic keyboard instrument which includes a base plate, on which keys and mass elements of a keyboard are mounted, and a frame configured to hold the base plate below the keys. In this keyboard structure, the frame has multiple reinforcement ribs for reinforcing the frame itself. The multiple reinforcement ribs are formed individually between a white key and a white key of the keyboard, so that a mass element which is being swung and the reinforcement rib are prevented from interfering with each other.

SUMMARY

According to an aspect of the present disclosure, there is provided an electronic keyboard instrument including a casing, a keyboard having multiple keys which are provided to be exposed from the casing, a sound emitting unit provided inside the casing, and multiple ribs provided between the keyboard and the sound emitting unit at a position corresponding to at least one of the multiple keys, wherein at least a part of spaces between the multiple ribs has an opening, and wherein a communication passage is formed in the casing in such a manner as to extend from the sound emitting unit to reach a key gap between the multiple keys by way of the opening.

DESCRIPTION OF THE EMBODIMENT

Figure 1:
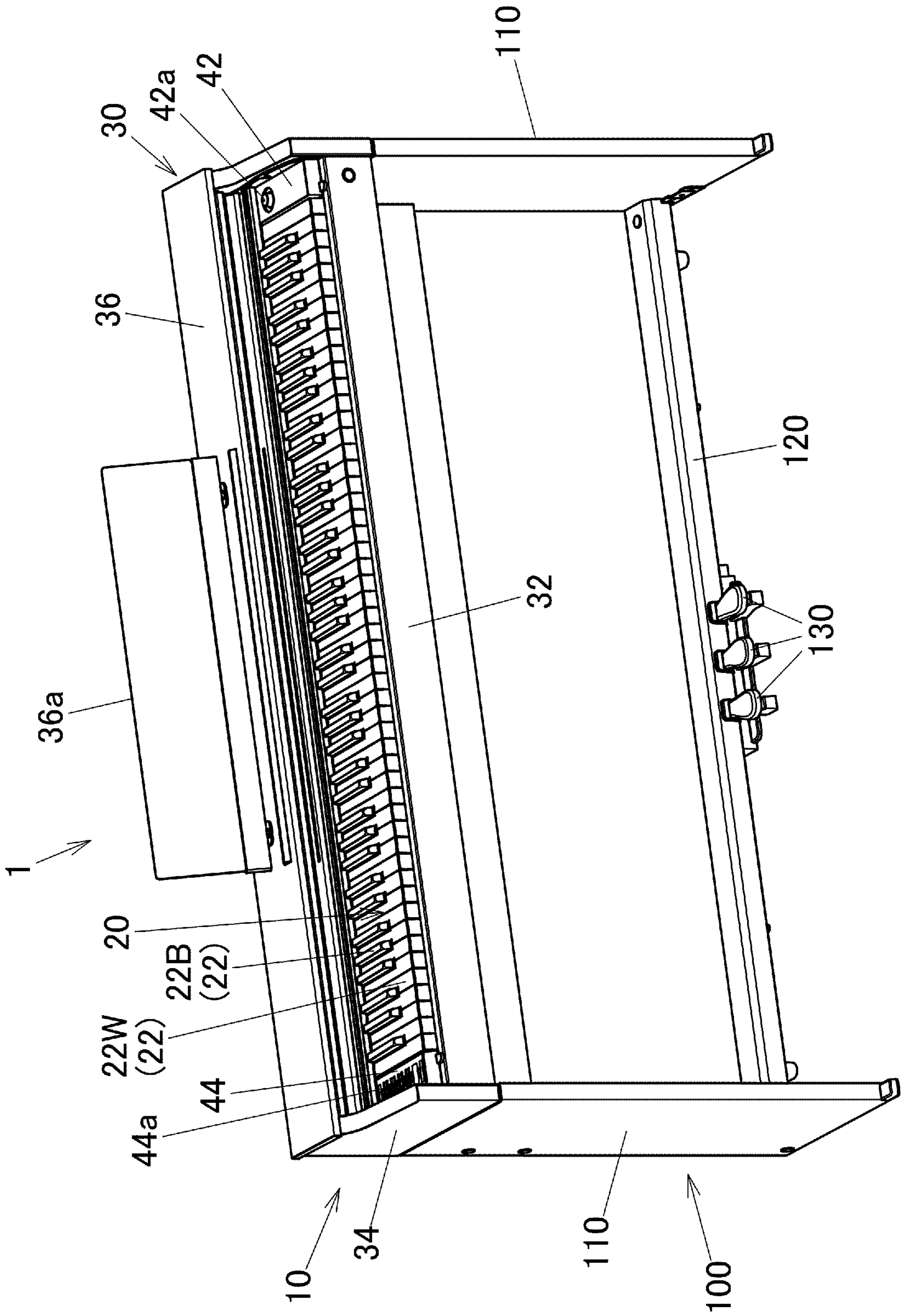
FIG. 1 is an overall perspective view of an electronic keyboard instrument according to an embodiment of the present disclosure as viewed from a front side.
Figure 2:
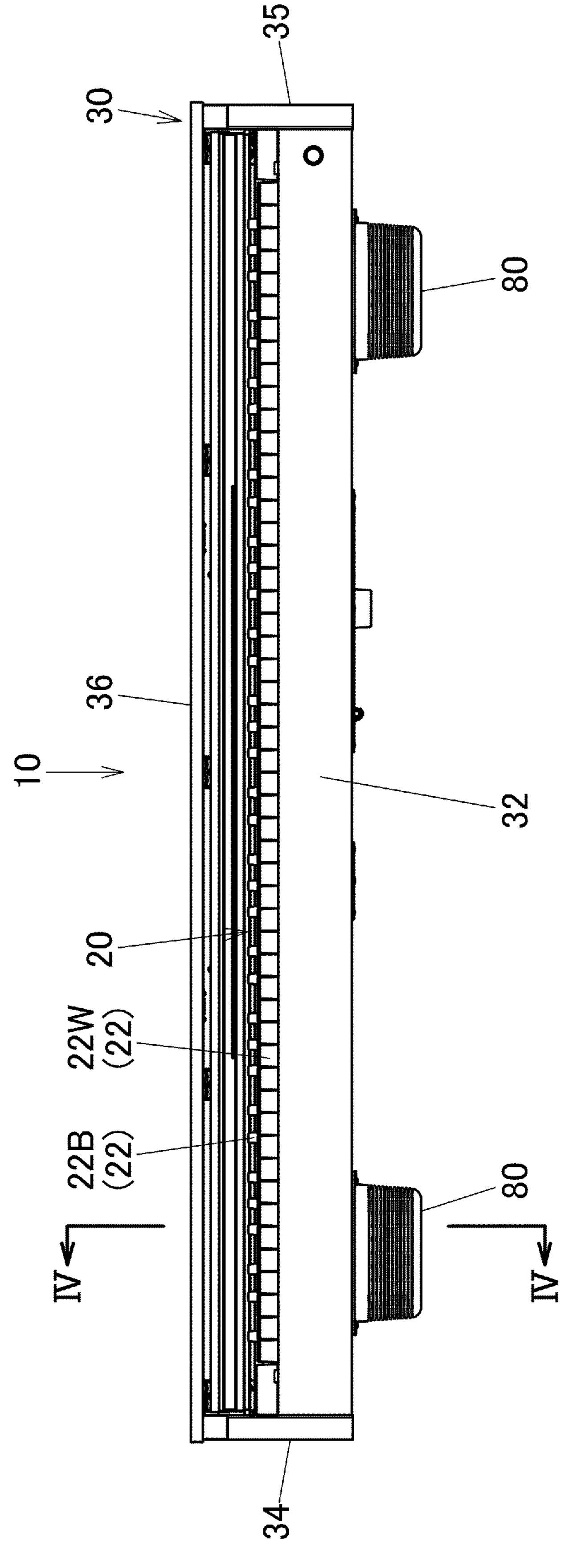
FIG. 2 is a front view of a main body part of the electronic keyboard instrument according to the embodiment.

Referring to drawings, an embodiment of the present disclosure will be described. An electronic keyboard instrument 1 shown in FIG. 1 includes a main body part 10 and a leg part 100. As shown in FIGS. 1 and 2, the main body part 10 includes a keyboard 20, which has multiple keys 22 such as white keys 22W and black keys 22B, and a main body case (a casing) 30 which surrounds the keyboard 20 to hold it. The leg part 100 includes a pair of side plate units 110, a pedal frame 120, and a pedal device 130. In the following description, an alignment direction of the multiple keys 22 of the keyboard 20 is referred to as a left-right direction (in FIGS. 1 and 2, a direction towards a left side is referred to as a leftward direction), an extending direction of each key 22 is referred to as a front-back direction (in FIGS. 1 and 2, a direction towards a nearer side is referred to as a frontal direction), and an upper-lower direction of the electronic keyboard instrument 1 is referred to as an upper-lower direction (in FIGS. 1 and 2, a direction towards an upper side is referred to as an upper direction).

As shown in FIG. 1, the pair of side plate units 110 are plate unis which are erected on a setting surface on both left- and right-hand sides of the electronic keyboard instrument 1 in such a posture that both plate surfaces are oriented in the left-right direction so as to support the main body case 30. The pedal frame 120 connects the pair of side plate units 110 together at lower sides thereof. The pedal device 130 is provided substantially at a central portion of the pedal frame 120 in the left-right direction. Hereinafter, a configuration of the main body port 10 will be described in detail.

As shown in FIGS. 1 to 4, when viewed from above, the main body case 30 has substantially a rectangular shape which is elongated laterally in such a manner that a longitudinal direction thereof follows the left-right direction and has thick plates such as a front surface plate 32, a back surface plate 33, a left side surface plate 34, a right side surface plate 35, an upper surface plate 36, and a lower surface plate 37. In addition, the main case body 30 has substantially an L-shaped vertical section (refer to FIG. 4). The front surface plate 32 has substantially a rectangular shape which is elongated in the left-right direction and is provided at a front lower portion of the main body part 10, constituting a front surface of the main body case 30. The back surface plate 33 has substantially a rectangular shape which is elongated in the left-right direction and is provided on a back side of the main body part 10, constituting a back surface of the main body case 30.

The left side surface plate 34 and the right side surface plate 35 have substantially a rectangular shape which is elongated in the front-back direction and are provided on a left-hand side and a right-hand side of the main body part 10, constituting a left side surface and a right side surface of the main body case 30, respectively. The upper surface plate 36 has substantially a rectangular shape which is elongated in the left-right direction and is provided at an upper backward portion of the main body part 10, constituting an upper surface of the main body case 30. As shown in FIG. 1, a music stand 36*a* is attached substantially to a central portion of the upper surface plate 36 in the left-right direction. Here, in descriptions by reference to FIG. 2 onwards, the music stand 36 is omitted from illustration. The lower surface plate 37 has substantially a rectangular shape which is elongated in the left-right direction and is provided at a lower side of the main body part 10, constituting a lower surface of the main body case 30.

Figure 4:
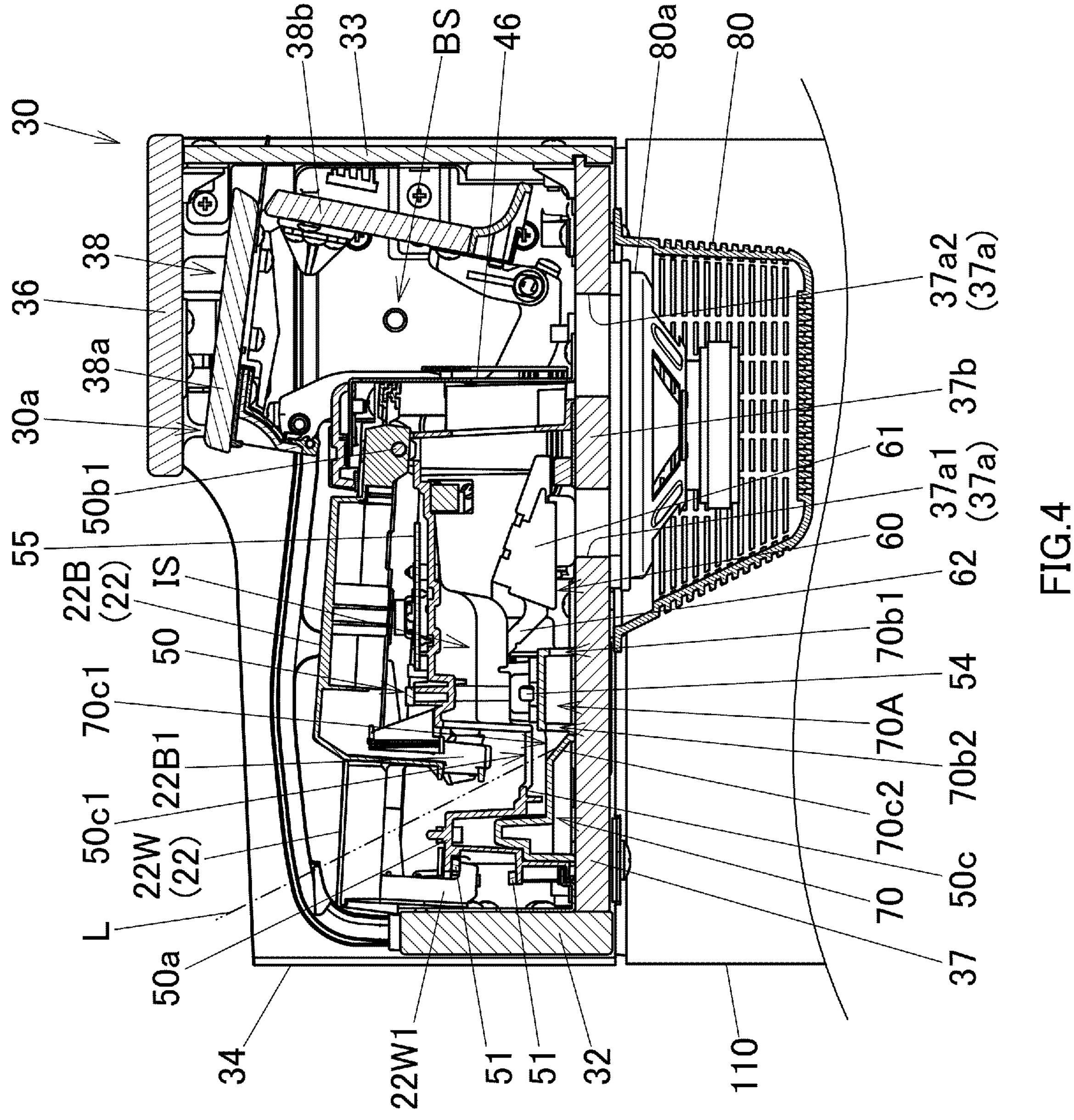
FIG. 4 is a sectional view of the main body part of the electronic keyboard instrument according to the embodiment, which is a sectional view taken along a line IV-IV in FIG. 2.
Figure 5:
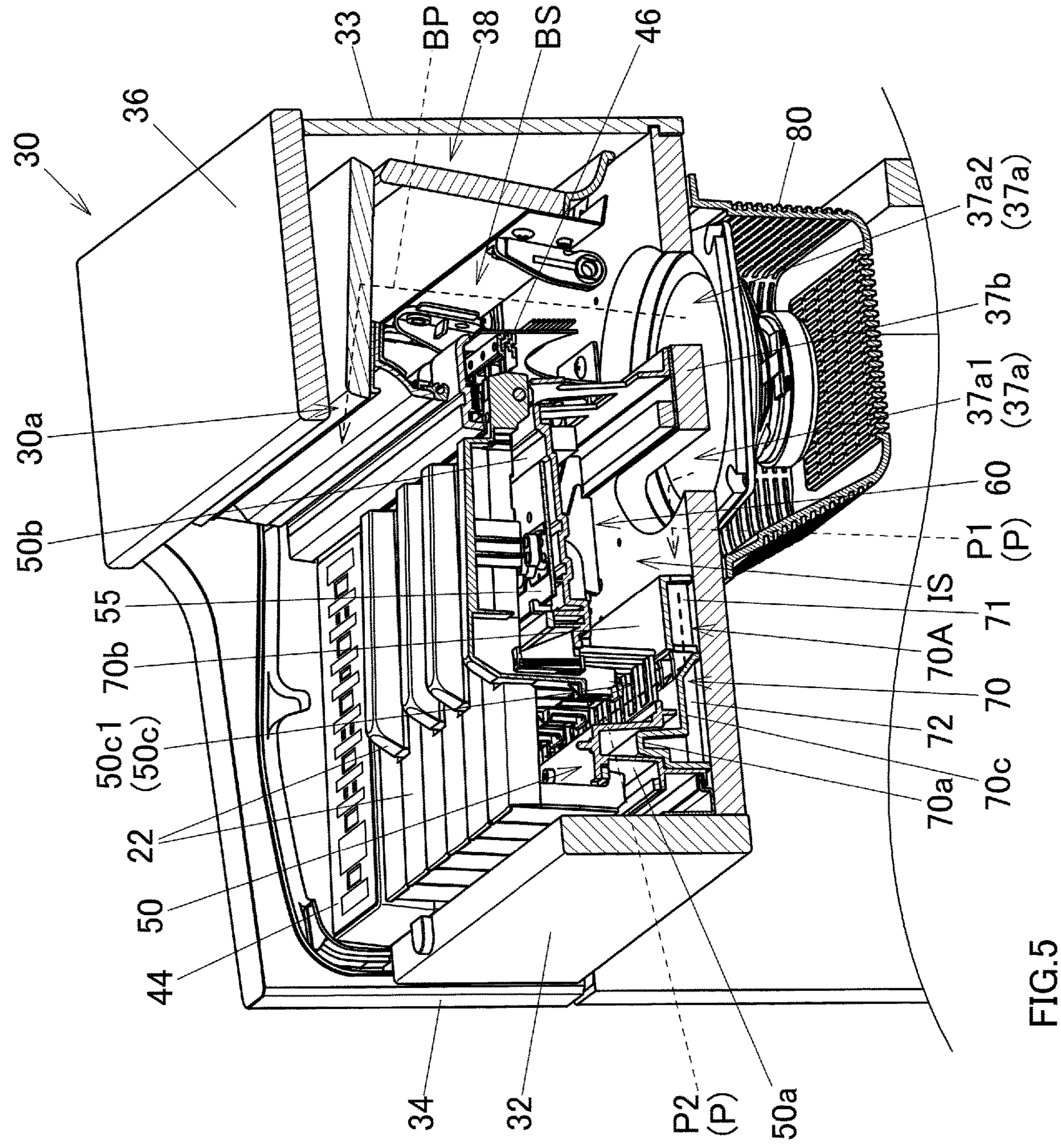
FIG. 5 is a perspective sectional view of the main body part of the electronic keyboard instrument according to the embodiment, which is a perspective sectional view of a section corresponding to FIG. 4.

As shown in FIGS. 4 and 5, a substantially circular sound emitting hole 37*a*, which is opened in the upper-lower direction, is provided at a slightly backward portion of the lower surface plate 37 at each of left and right end portions thereof. Each sound emitting hole 37*a* is divided in the front-back direction substantially into a semi-circular shape by a part (hereinafter, referred to as a "dividing portion 37*b*") of the lower surface plate 37, and a frontal opening is referred to as a first sound emitting hole 37*a*1, while a backward opening is referred to a second sound emitting hole 37*a*2. The first sound emitting hole 37*al* is made slightly smaller in the size of the opening than the second sound emitting hole 37*a*2.

Figure 3:
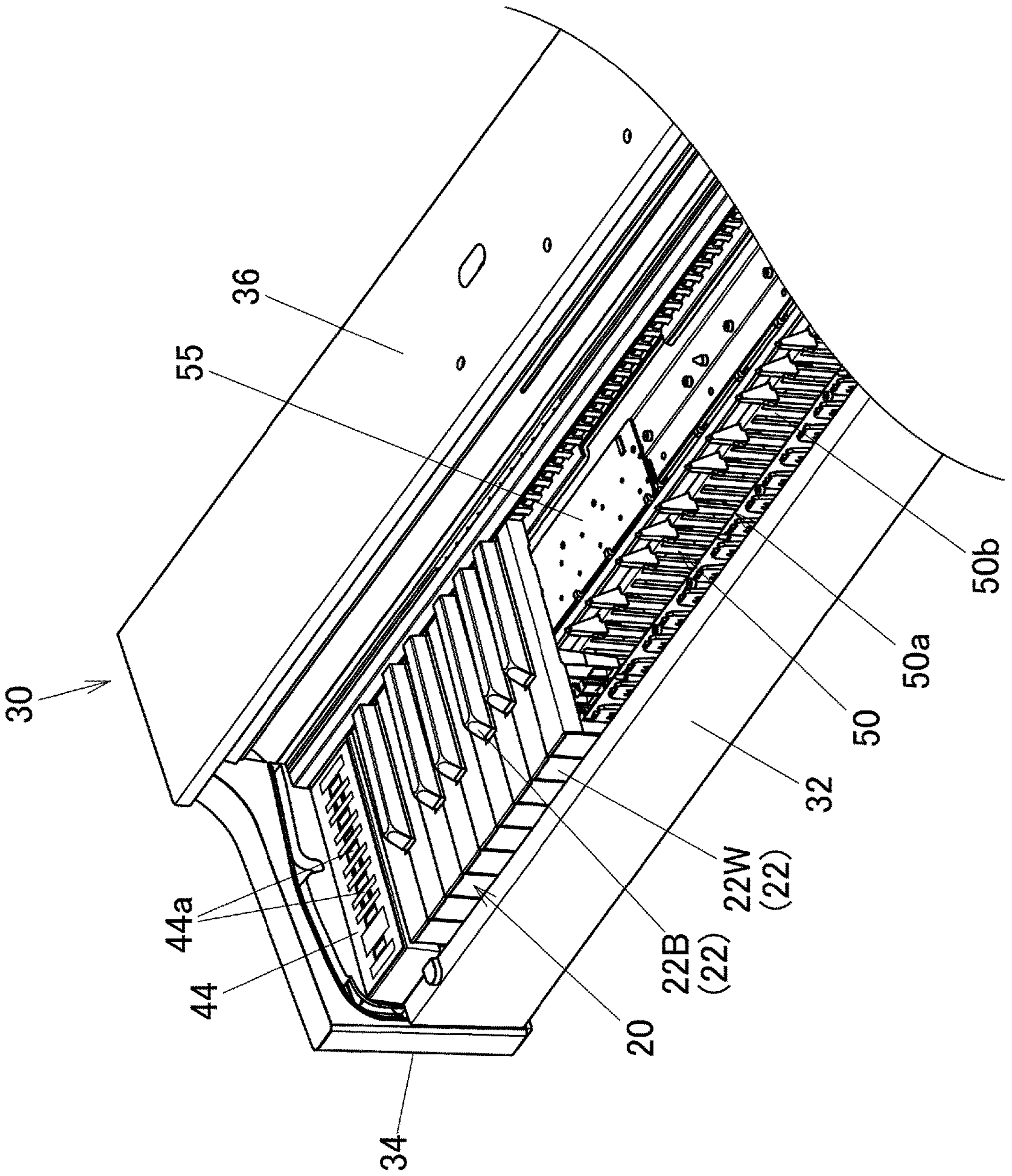
FIG. 3 is a partial perspective view of the main body part of the electronic keyboard instrument according to the embodiment.

As shown in FIG. 3, the main body case 30 has an opening in a front upper side thereof, and upper surfaces, which constitute key press-down surfaces, and portions of front surfaces of the keys 22 of the keyboard 20 are exposed outwards from the opening so formed. As shown in FIG. 4, the main body part 10 includes a lid 38 for covering a portion of the keyboard 20 which is exposed outwards. The lid 38 is a thick plate and is made up of a first lid 38*a* and a second lid 38*b* which are each a plate-shaped unit having substantially a rectangular shape which is elongated in the left-right direction. The first lid 38*a* and the second lid 38*b* are coupled together in such a manner as to be folded into two portions, so as to be installed in an interior of the main body part 10 while being freely pushed into and pulled out of the interior of the main body part 10 from an opening provided between the keyboard 20 and the upper surface plate 36 (hereinafter, referred to as an "upper opening portion 30*a*" (refer to FIG. 4)). In the electronic keyboard instrument 1, when a power supply is switched off, the lid 38 is pulled out of the interior of the main body part 10 to cover the opening of the main body case 30, whereby the exposed portion of the keyboard 20 is covered.

In the electronic keyboard instrument 1, the main body case 30 of the main body part 10 which is exposed outwards and the side plate units 110 of the leg part 100 are made of wood, so as to be characterized by a feeling of good quality. As shown in FIG. 1, a power supply panel unit 42 where a power supply button 42*a* and the like are disposed is provided between the keyboard 20 and the right side surface plate 35. In addition, a setting panel unit 44 where a volume control button 44*a* and the like are disposed is provided between the keyboard 20 and the left side surface plate 34.

As shown in FIGS. 3 to 5, an inner case 50 is provided in an interior of the main body case 30. The inner case 50 is provided in such a manner as to extend substantially over a whole area of a lower side of the keyboard 20, and similar to the keyboard 20, the inner case 50 has a laterally elongated shape. The inner case 50 is configured as a hollow unit which is opened downwards. A sheet metal unit 46 substantially having a plate shape is provided on a back side of the inner case 50 in such a posture that both sheet surfaces thereof are oriented in the front-back direction. A back space BS is provided between the sheet metal unit 46 and the back surface plate 33. In addition, an inner space IS is provided inside the inner case 50 in a position lying between the inner case 50 and the lower surface plate 37. The sheet metal unit 46 is provided on an upper side of the dividing portion 37*b* of the lower surface plate 37. As a result, in the sound emitting hole 37*a*, the first sound emitting hole 37*al* communicates with the inner space IS, while the second sound emitting hole 37*a*2 communicates with the back space BS. Here, the lid 38 described above is configured to be installed in the back space BS.

A front end portion of the inner case 50 is formed into a case-side convex portion 50*a* which protrudes upwards into a convex shape. A portion of the inner case 50 which is situated below lower sides of the black keys 22B of the keys 22 is formed into a case-side table portion 50*b* which protrudes upwards into a table shape. A portion lying between the case-side convex portion 50*a* and the case-side table portion 50*b* is formed into a case-side concave portion 50*c* which protrudes downwards into a protrusion. A rotational fulcrum 50*b*1, which is configured to rotationally support a back end portion of each key 22 of the keyboard 20, is provided at a back side portion of an upper surface of the case-side table portion 50*b*. In addition, a control circuit board 55 is provided on an upper surface of the case-side table portion 50*b*. A switch is provided on the control circuit board 55 so as to sound a note corresponding to the key 22 which is pressed down. Multiple case-side openings 50*c*1, which are opened in the upper-lower direction, are provided in the corresponding case-side concave portions 50*c* in such a manner as to be aligned in the left-right direction (refer to FIG. 5).

A hook-shaped white key restricting portion 22W1 is provided on each of the white keys 22W of the keys 22 in such a manner as to extend downwards from a front end portion of the white key 22W, so that an upper limit position and a lower limit position of the white key 22W are restricted by this white key restricting portion 22W1 as a result of the white key restricting portion 22W1 interfering with first cushions 51 which are provided at an uppermost portion and a lowermost portion of the case-side convex portion 50*a* on a front side thereof, respectively. In addition, a black key restricting portion 22B1 is provided on each of the black keys 22B of the keys 22 in such a manner as to extend downwards from a front end portion of the black key 22B, so that an upper limit position and a lower limit position of the black key 22B are restricted by this black key restricting portion 22B1 as a result of the black key restricting portion 22B1 interfering with second cushions 52 which are provided at an uppermost portion and a lowermost portion of the case-side table portion 50*b* on a front side thereof, respectively.

Multiple hammers 60 are provided individually inside the case-side table portions 50*b* within the inner space IS in such a manner as to connect with the corresponding keys 22. In addition, in FIG. 4, to facilitate the description of the first sound emitting hole 37*a*, a first communication passage P1, and the like, a part of the hammer 60 is omitted from illustration. The hammer 60 includes a weight 61 having substantially a triangular shape and an arm 62 extending forwards from the weight 60 into a straight line. The arm 62 is rotatably supported on a pivot 54 provided at an inner frontal portion of the case-side table portion 50*b*. Here, when the key 22 is pressed down, the weight 61 of the hammer 60 rises so as to impart heaviness to the key 22 when the key 22 is pressed down. As a result, a key press-down feeling can be obtained which is close to a key press-down feeling provided by a real piano.

A support unit 70 is provided at a frontal portion in the inner space IS in such a manner as to be disposed on the lower surface plate 37. The support unit 70 is screwed down onto the lower surface plate 37 to thereby be attached to the main body case 30. The keyboard 20 is indirectly supported on the main body case 30 made of wood via the inner case 50. The pivot 54 for supporting the arm 62 of the hammer 60 is provided on the support unit 70. A configuration of the support unit 70 will be described in detail later on.

As shown in FIGS. 2 and 4, the electronic keyboard instrument 1 has two loudspeakers 80 (sound emitting units) on a lower side of the main body case 30. Each loudspeaker 80 is screwed down to a lower side of the lower surface plate 37 for attachment, with a sound emitting side of a cone 80*a* oriented upwards, in such a manner as to correspond to the corresponding sound emitting hole 37*a* provided in the lower surface plate 37. In addition, each loudspeaker 80 is provided in a position where the loudspeaker 80 does not overlap with a portion of a key gap defined between the keys 22 which is situated at a distal portion of the key 22 in the upper-lower direction. The size of the cone 80*a* substantially coincides with the size of the corresponding sound emitting hole 37*a*, and a sound emitted from each loudspeaker 80 is configured to pass through the first sound emitting hole 37*al* to be transmitted to the inner space IS while passing through the second sound emitting hole 37*a*2 to be transmitted to the back space BS.

As has been described above, the various constituent components such as the keyboard 20, the inner case 50, the control circuit board 55, the hammers 60, and the support unit 70 are provided in the inner space IS. A sound piece of the sound emitted from the loudspeaker 80 to be transmitted to the inner space IS passes through a gap between the support unit 70 and the inner case 50 to be emitted towards a player from a gap between the keys 22. That is, a communication passage P (refer to FIG. 5) is provided in the inner space IS for propagation of a sound in such a manner that a sound emitted from the loudspeaker 80 reaches the gap between the keys 22 after passing through the first sound emitting hole 37*al*.

On the other hand, a sound piece of the sound emitted from the loudspeaker 80 to be transmitted to the back space BS passes through the back space BS where the lid 38 is installed to be emitted towards the player from the upper opening portion 30*a*. That is, a back communication passage (the other communication passage) BP (refer to FIG. 5) is provided in the back space BS for propagation of a sound in such a manner that a sound emitted from the loudspeaker 80 reaches the upper opening portion 30*a* (upwards of the keyboard 20) after passing through the second sound emitting hole 37*a*2. The back communication passage BP is configured to communicate from the loudspeaker (sound emitting unit) 80 to a portion situated further backwards than a portion of the key 22 which is situated at a key back end of the key 22 and on an upper surface side of the keyboard 20. The back communication passage BP is provided in a position where the back communication passage BP does not overlap with the keyboard 20 in the upper-lower direction. Here, the back communication passage BP also includes a path extending upwards from the second sound emitting hole 37*a*2 after passing through a semi-circular cutout provided in the sheet metal unit 46.

Next, the communication passage P provided in the inner space IS will be described in detail. As shown in FIG. 5, in the present embodiment, the communication passage P includes the first communication passage P1 which extends from the first sound emitting hole 37*al* and past below the hammers 60, passes through the gap between the lower surface plate 37 and the inner case 50, and reaches multiple support unit opening portions (openings) 70A (refer to FIG. 4) provided in an interior of the support unit 70 and a second communication passage P2 which extends from the support unit opening portions 70A to an upper side of the support unit 70, extends further to an upper side of the inner case 50, and reaches the gap between the keys 22.

Here, referring to FIGS. 4 to 7, configurations of the support unit 70 and the support unit opening portion 70A will be described. As shown in FIG. 7, the support unit 70 is formed into a laterally elongated shape and is provided inside the inner case 50. The support unit 70 is configured as a hollow unit which is opened downwards. A front end portion of the support unit 70 is formed into a support-side convex portion 70*a* which protrudes upwards into a convex shape and is disposed below the case-side convex portion 50*a*. A back end portion of the support unit 70 is formed into a support-side table portion 70*b* which protrudes upwards into a table shape and is disposed below the case-side table portion 50*b* in a position lying closer to a front of the case-side table portion 50*b*. A portion lying between the support-side convex portion 70*a* and the support-side table portion 70*b* is formed into a support-side concave portion 70*c* which is recessed downwards into a concave and is disposed below the case-side concave portion 50*c*.

Figure 6:
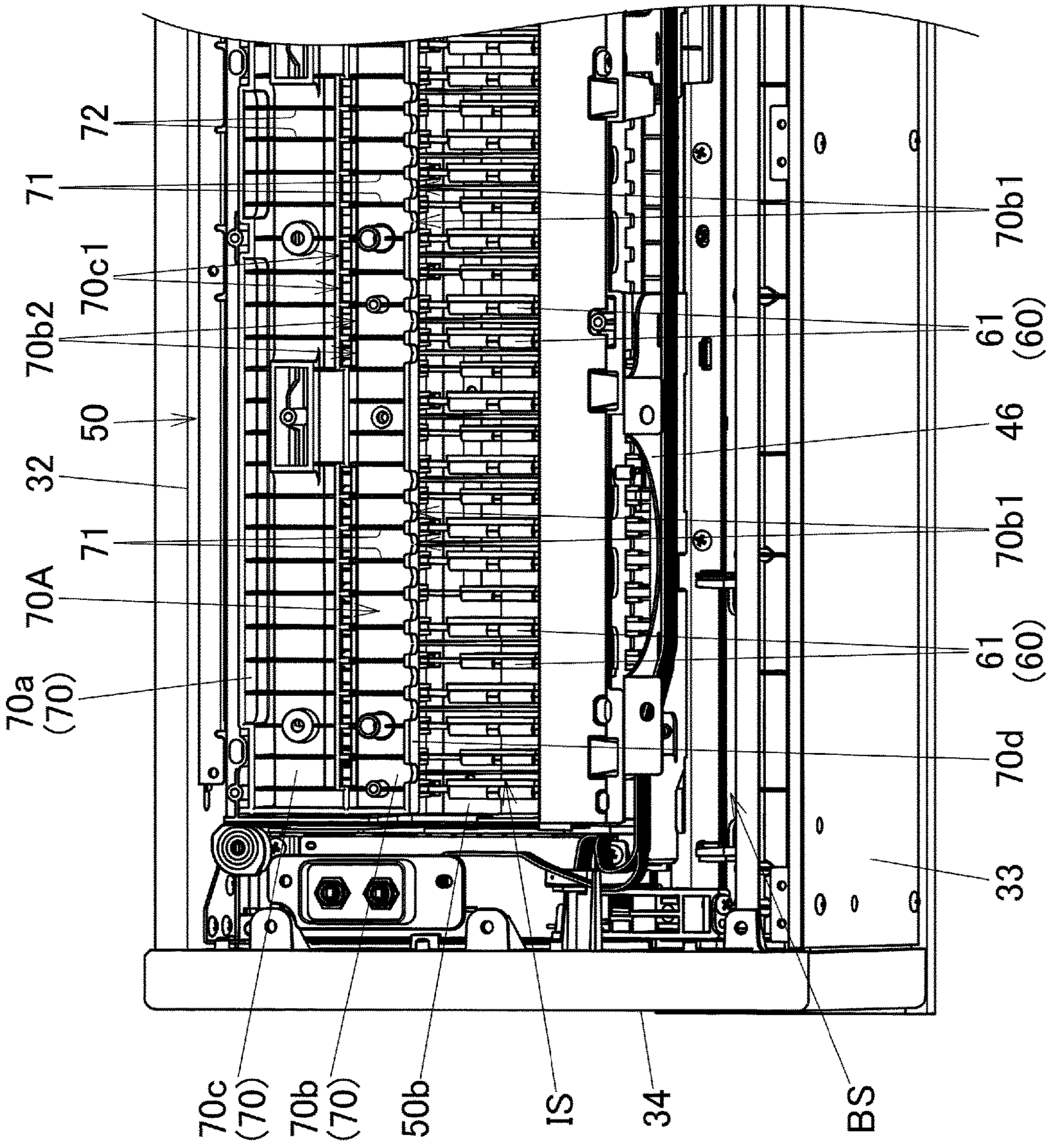
FIG. 6 is a perspective view, as viewed from a lower side, of an interior of the main body part of the electronic keyboard instrument according to the embodiment.
Figure 7:
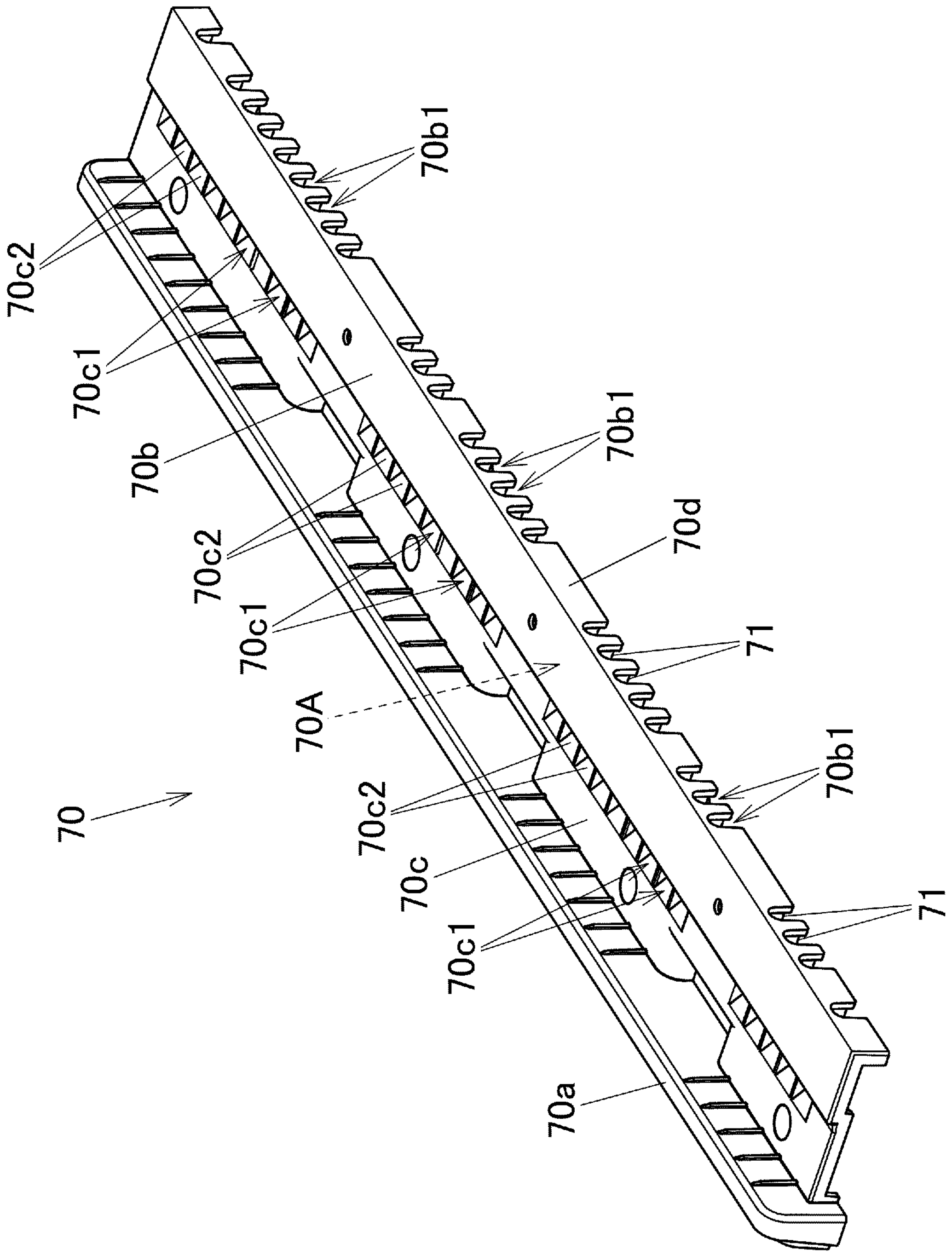
FIG. 7 is a partial perspective view of a support unit of the electronic keyboard instrument according to the embodiment.

As shown in FIG. 6, multiple first reinforcement ribs (ribs) 71, which extend along the front-back direction, are provided at substantially equal intervals in the left-right direction over substantially a whole area of a lower surface side of the support-side convex portion 70*a*. In addition, multiple second reinforcement ribs (ribs) 72, which extend along the front-back direction, are provided at substantially equal intervals in the left-right direction over substantially a whole area of a lower surface side of the support-side concave portion 70*c*. Each first rib 71 and each second rib 72 are erected substantially vertically at a position corresponding to each key 22 corresponding thereto. Specifically speaking, each first rib 71 and each second rib 72 are so erected directly below each key 22 corresponding thereto 22. As a result, there is provided a configuration in which substantially a whole area of the keyboard 20 is supported uniformly via the inner case 50 by the first ribs 71 and the second ribs 72.

The hammers 60 which are provided on a lower side of the case-side table portion 50*b* are provided on a back side of the support-side convex portion 70*a*. The first ribs 71 and the second d ribs 72 are provided in positions corresponding to the hammers 60. Specifically speaking, the first rib 71 and the second rib 72 are provided on the same straight line as a straight line on which the hammer 60 is provided in the front-back direction, and a central position of the hammer member 60 in the left-right direction coincides with the first rib 71 and the second rib 72.

The multiple support unit opening portions 70A described above constitute passages provided in an interior of the support unit 70, and each passage extends from a back end portion 70*d* of the support unit 70, passes through a space defined between the first ribs 71, and reaches an upper side of the support-side concave portion 70*c*. Specifically speaking, as shown in FIGS. 4 and 6, multiple first openings 70*b*1, each having substantially an arch shape, are provided between the first ribs 71 in the back end portion 70*d* of the support unit 70 (a back end portion of the support-side table portion 70*b*) in such a manner as to be opened in the front-back direction. In addition, multiple second openings 70*b*2, each having substantially a quadrangular shape, are provided between the first ribs 71 in a front end portion of the support-side table portion 70*b* in such a manner as to be opened in the front-back direction. Each first opening 70*b*1 and each second opening 70*b*2 are positioned on the same straight line extending along the lower surface plate 37.

On the other hand, multiple third openings 70*c*1, each having substantially a quadrangular shape, are provided between the second ribs 72 in the support-side concave portion 70*c* in positions lying closer to the support-side table portion 70*b* in such a manner as to be opened in the upper-lower direction. Each third opening 70*c*1 is provided at a position corresponding to each case-side opening 50*c*1 in the upper-lower direction, that is, in a position where each third opening 70*c*1 does not overlap with each case-side opening 50*c*1 in the upper-lower direction.

An inclined surface 70*c*2 is provided on a lower side of each third opening 70*c*1 in such a manner as to incline from the second opening 70*b*2 towards the third opening 70*c*1. Each inclined surface 70*c*2 inclines so that a sound is reflected from an upper surface of the lower surface plate 37 which constitutes a horizontal plane towards the gap between the keys 22, that is, towards the player. In other words, the inclined surface 70*c*2 is set at an inclination angle at which the gap between the keys 22 is positioned on an imaginary line L which indicates an orbital path of a reflection sound which is reflected by the inclined surface 70*c*2. Specifically speaking, the inclination angle of the inclined surface 70*c*2 is preferably in a range from 45° to 60°. As a result of the inclined surface 70*c*2 being made to incline at such an inclination angle, a sound which is reflected on the inclined surface 70*c*2 is configured to reach the gap between the keys 22 without interfering with any other constituent elements.

Thus, each support unit opening portion 70A constitutes a passage which extends from the first opening 70*b*1, passes through an interior of the support-side table portion 70*b*, extends through the second opening 70*b*2, and reaches the third opening 70*c*1 by way of the inclined surface 70*c*2. As a result, each support unit opening portion 70A constitutes a passage which penetrates the support unit 70 from a side facing the inner space IS towards a side facing a space defined below the multiple keys 22.

Returning to the configuration of the communication passage P, the second communication passage P2 constitutes a path which extends through the third opening 70*c*1 of the support unit opening portion 70A, then extends through the case-side opening 50*c*1 to communicate with an upper side of the inner case 50, and finally reaches the gap between the keys 22. In this way, a wall surface or the like which interrupts a passage of a sound is not provided halfway through a whole length of the communication passage P which includes the first communication passage P1 and the second communication passage P2, and hence the communication passage P constitutes a series of passages which defines a communication from the first sound emitting hole 37*al* to the gap between the keys 22 to thereby constitute a path through which a sound is propagated effectively.

Hereinafter, advantages of the electronic keyboard instrument 1 of the present disclosure will be described based on a comparison made between the electronic keyboard instrument disclosed in Japanese Unexamined Patent Application Publication No. 2007-17614 and the electronic keyboard instrument 1 of the present disclosure. In the configuration as of the electronic c keyboard instrument disclosed in Japanese Unexamined Patent Application Publication No. 2007-17614 in which the multiple ribs are individually provided in the position lying lower than the keys and between the white key and the white key in order to enhance the reinforcement effect, the multiple ribs may interrupt the passage of a sound, whereby it occasionally becomes difficult to secure sufficiently the sound emitting path from the speaker to the gap between the keys of the keyboard within the casing (for example, in the position lower than the keyboard or on the back side of the casing). As a result, there has been a fear that a good sound image cannot be obtained.

In contrast with this electronic keyboard instrument according to the related art, the electronic keyboard instrument 1 according to the present embodiment includes the main body case 30, the keyboard 20 having the multiple keys 22 which are provided in such a manner as to be exposed from the main body case 30, the loudspeakers 80 (the sound emitting units) provided inside the main body case 30, and the multiple first ribs 71 and second ribs 72 which are provided between the keyboard 20 and the loudspeakers 80 in such a manner that the first rib 71 and the second rib 72 are provided at the position corresponding to at least one of the multiple keys 22. Then, the space between the multiple first ribs 71 and second ribs 72 has an opening (the support unit opening portion 70A). In addition, the communication passage P is provided in the main body case 30 in such a manner as to extend from the loudspeaker 80 to reach the key gap between the multiple keys 22 by way of the support unit opening portion 70A.

With the electronic keyboard instrument 1 of the present embodiment which is configured as described above, a sound emitted from the loudspeaker 80 towards the support unit opening portion 70A passes through the communication passage P by way of the support unit opening portion 70A provided between the first ribs 71 and the second ribs 72 so as to be propagated towards the key gap defined between the multiple keys 22, that is, towards the player without being interrupted by a wall surface of the like. As a result, the sound emitting path from the loudspeaker 80 towards the player can be secured while realizing the configuration in which the keyboard 20 is supported uniformly by the first ribs 1 and the second ribs 72 which are provided in the positions corresponding individually to the multiple keys 22, thereby making it possible to secure the sound passage structure with good efficiency. As a result, with the electronic keyboard instrument 1 of the present embodiment, a good sound image can be obtained while maintaining the strength of the constituent elements.

With the electronic keyboard instrument 1 according to the present embodiment, the communication passage P includes the first communication passage P1 configured to extend from the loudspeaker 80 to reach the support unit opening portion 70A and the second communication passage P2 configured to extend from the support unit opening portion 70A to reach the key gap between the multiple keys 22. According to this configuration, for example, a path extending from the loudspeaker 80 to the support unit opening portion 70A by way of the space below the keyboard 20 can be formed into the first communication passage P1, while a path passing through the interior of the unit where the first ribs 71 and the second ribs 72 are provided to reach the key gap between the multiple keys 22 can be formed into the second communication passage P2. In this way, the specific configuration for the communication passage P can be provided.

The electronic keyboard instrument 1 according to the present embodiment includes the hammers 60 corresponding individually to the multiple keys 22, and each first rib 71 and each second rib 72 are provided at the position corresponding to each hammer member 60. As a result, a part of the communication passage P can be formed into a path which passes through a space between the hammers 60, whereby the specific configuration for the communication passage P can be provided in which the passage of sound is not interrupted by a wall surface or the like. In addition, the reinforcement structure of each key 22 of the keyboard 20 can be made uniform as a result of each first rib 71 and each second rib 72 corresponding to each hammer 60. Further, the reinforcement structure can be adjusted for each key 22 by adjusting the first rib 71 and the second rib 72 which correspond to each key 22.

The electronic keyboard instrument 1 according to the present embodiment includes the support unit 70 provided below the keyboard 20 to support the keyboard 20, and the first ribs 71 and the second ribs 72 are provided on the support unit 70. As a result, the support unit 70 can be reinforced by the first ribs 71 and the second ribs 72, whereby the configuration can be realized in which the keyboard 20 is effectively supported by the support unit 70.

With the electronic keyboard instrument 1 according to the present embodiment, the multiple first ribs 71 and second ribs 72 are provided in such a manner that the first rib 71 and the second rib 72 are erected substantially vertically at the position corresponding to one of the multiple keys 22. As a result, sound passing through the communication passage P can be propagated rectilinearly, whereby the sound passage structure with better efficiency can be secured.

With the electronic keyboard instrument 1 according to the present embodiment, the main body case 30 includes the lower surface plate 37 on an upper surface of which the support unit 70 is disposed, and the communication passage P includes the inclined surface 70*c*2 in which an angle formed between the lower surface plate 37 and itself constitutes an angle of elevation and configured to incline from a back of the main body case 30 to a front of the main body case 30. In other words, the communication passage P includes the inclined surface 70*c*2 that is configured to incline from a plate surface of the lower surface plate 37 which is made into the horizontal plane towards the key gap between the multiple keys 22. Thus, by providing the inclined surface 70*c*2 at the portion of the communication passage P as described above, the specific configuration can be provided which can realize the communication passage P extending from the loudspeaker 80 provided on the lower side of the main body case 30 to the player, that is, upwards of the main body case 30. In addition, when compared with a case in which a communication passage which is bent substantially vertically is provided, by providing the inclined surface 70*c*2 as described above, the communication passage P can be realized in which the reflection of sound is reduced, allowing sound to be propagated with good efficiency.

With the electronic keyboard instrument 1 according to the present embodiment, the inclined surface 70*c*2 is set at the inclination angle at which the key gap between the multiple keys 22 is positioned on the imaginary line L extending along the inclined surface 70*c*2. As a result, the specific inclination angle of the inclined surface 70*c*2 can be provided which can realize the communication passage P extending from the loudspeaker 80 towards the player.

With the electronic keyboard instrument according to the present embodiment, the loudspeaker 80 and the portion of the key gap between the multiple keys 22 which is positioned on the imaginary line L are provided in the position where the loudspeaker 80 and the portion of the key gap do not overlap each other in a vertical direction in a cross-sectional view of the electronic keyboard instrument 1. According to this configuration, the space where the hammer 60 is provided to impart the heaviness to each key 22 can be provided on the upper side of the loudspeaker 80, whereby the communication passage P extending from the loudspeaker 80 to the key gap between the multiple keys 22 can be provided efficiently inside the interior of the main body case 30.

The electronic keyboard instrument 1 according to the present embodiment has the back communication passage BP configured to communicate from the loudspeaker 80 to the upper side of the keyboard 20 by way of the path which does not overlap with the keyboard 20 in a vertical direction in a cross-sectional view of the electronic keyboard instrument 1. According to this configuration, since not only is sound from the loudspeaker 80 propagated towards the player by way of the communication passage P, but also sound from the loudspeaker 80 is propagated towards the player further by way of the back communication passage BP, the electronic keyboard instrument 1 can be realized in which the sound is emitted from both the upper and lower sides of the keyboard 20, and the sound from the loudspeaker 80 is propagated towards the player effectively. In addition, since the sound is emitted from both the upper and lower sides of the keyboard 20, when compared with a case in which the path along which sound is propagated is limited to either of the communication passage P and the back communication passage BP, the sound pressure of sound transmitted to the player can be enhanced irrespective of the height of the player who is seated. Further, the player can be imparted a sensation that sound is being made and emitted from the whole of the electronic keyboard instrument 1.

Here, the embodiment of the present disclosure that has been described heretofore is presented as the example, and hence, there is no intention to limit the scope of the present disclosure by the embodiment. The novel embodiment can be carried out in other various forms, and various omissions, replacements, and modifications can be made thereto without departing from the spirit and scope of the present disclosure. Those resulting embodiments and modified examples thereof are included in the scope and gist of the present disclosure and are also included in the scope of disclosures claimed for patent under claims below and their equivalents.

What is claimed is:

1. An electronic keyboard instrument comprising:

a casing;

a keyboard having multiple keys which are provided to be exposed from the casing;

a sound emitting unit provided inside the casing; and multiple ribs provided between the keyboard and the sound emitting unit at a position corresponding to at least one of the multiple keys; and a support unit provided below the keyboard to support the keyboard, wherein at least a part of spaces between the multiple ribs has an opening, and wherein a communication passage is formed in the casing in such a manner as to extend from the sound emitting unit to reach a key gap between the multiple keys by way of the opening, wherein the multiple ribs are provided on the support unit, wherein the casing comprises a lower surface plate on an upper surface of which the support unit is disposed, and wherein the communication passage comprises an inclined surface in which an angle formed between the lower surface plate and itself constitutes an angle of elevation and configured to incline from a back of the casing to a front of the casing.

2. The electronic keyboard instrument according to claim 1,
   wherein the communication passage comprises a first communication passage configured to extend from the sound emitting unit to reach the opening and a second communication passage configured to extend from the opening to reach the key gap between the multiple keys.

3. The electronic keyboard instrument according to claim 1, comprising:
   hammers corresponding individually to the multiple keys, wherein the multiple ribs are provided at a position corresponding to at least one of the hammers.

4. The electronic keyboard instrument according to claim 1,
   wherein the multiple ribs are provided in such a manner that the multiple ribs are erected substantially vertically on the support unit at a position corresponding to at least one of the multiple keys.

5. The electronic keyboard instrument according to claim 1,
   wherein an inclination angle of the inclined surface is set at an angle at which the key gap is positioned on an orbital path of at least a part of reflection sound reflected on the inclined surface.

6. The electronic keyboard instrument according to claim 5,
   wherein the inclination angle of the inclined surface is in a range of 45° to 60°.

7. The electronic keyboard instrument according to claim 1,
   wherein the inclined surface is provided on the support unit and is provided at the spaces between the multiple ribs.

8. The electronic keyboard instrument according to claim 1,
   wherein the sound emitting unit and a portion of the key gap which is situated at a key distal end of the key are provided in a position where the sound emitting unit and the portion of the key gap do not overlap each other in a vertical direction in a cross-sectional view of the electronic keyboard instrument.

9. The electronic keyboard instrument according to claim 8,
   wherein a back communication passage is formed in the casing, the back communication passage being configured to communicate from the sound emitting unit to a portion situated further backwards than a portion of the key which is situated at a key back end of the key and on an upper surface side of the keyboard.

* * * * *